US009020347B2

United States Patent
Koka et al.

(10) Patent No.: US 9,020,347 B2
(45) Date of Patent: Apr. 28, 2015

(54) RECONFIGURABLE OPTICAL INTERCONNECT NETWORK

(71) Applicant: Oracle International Corporation, Redwood City, CA (US)

(72) Inventors: Pranay Koka, Austin, TX (US); Herbert D. Schwetman, Jr., Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 57 days.

(21) Appl. No.: 14/021,555

(22) Filed: Sep. 9, 2013

(65) Prior Publication Data

US 2015/0071632 A1  Mar. 12, 2015

(51) Int. Cl.
*H04J 14/00* (2006.01)
*H04Q 11/00* (2006.01)

(52) U.S. Cl.
CPC .................. *H04Q 11/0071* (2013.01)

(58) Field of Classification Search
CPC .................................................... H04J 14/0212
USPC ...................................................... 398/45, 57
See application file for complete search history.

(56) References Cited

U.S. PATENT DOCUMENTS 8,218,465 B1 * 7/2012 Hou et al. .................. 370/311
2004/0233855 A1 * 11/2004 Gutierrez et al. ............ 370/252

* cited by examiner

*Primary Examiner* — Danny Leung

(74) *Attorney, Agent, or Firm* — Park, Vaughan, Fleming & Dowler LLP; Steven E. Stupp

(57) ABSTRACT

A network is described in which a base optical point-to-point (P2P) network can be reconfigured to a target network topology. This reconfigurable architecture customizes the network topology for different classes of applications to maximize throughput. In particular, the network can function efficiently at high-radix and low-radix traffic patterns. This capability is obtained using configurable electrical circuit switches at each node in the network. These configurable electrical circuit switches can be set so that incoming packets are directly routed to a specified output (either a local destination or an outgoing optical link) without: delay, contention, or buffers. In this way, predefined network topologies can be configured with improved node-to-node bandwidths when compared to the original P2P network by leveraging unused optical links. Furthermore, because the electrical circuit switches can be reconfigured, the network topology can be dynamically reconfigured to suit applications or application phases.

20 Claims, 7 Drawing Sheets

RECONFIGURABLE OPTICAL INTERCONNECT NETWORK

GOVERNMENT LICENSE RIGHTS

This invention was made with Government support under Agreement No. HR0011-08-9-0001 awarded by DARPA. The Government has certain rights in the invention.

BACKGROUND

1. Field

The present disclosure generally relates to optical networks. More specifically, the present disclosure relates to an optical network that includes a node with a circuit switch that is configured to implement a predefined network topology.

2. Related Art

Photonics technology provides high-bandwidth densities and low energy-per-bit compared to conventional electronic interconnects. However, a significant fraction of the power in a photonic interconnect is typically static because of the constant laser source and statically tuned micro-rings. If some of the optical links in an optical interconnect are not used by the communication traffic, the bandwidth is under-utilized and energy is wasted. In particular, an unused optical link burns nearly as much power as a used one.

For example, in a system with a cluster of nodes interconnected using a point-to-point (P2P) network, the P2P network gives high levels of performance for high-radix traffic. However, with low-radix traffic patterns a large fraction of the optical links on each node is not used.

The source of the low-radix traffic depends on the how the system is used. In a first use case, the system can be used to run a single large parallel application, and the application may exhibit low-radix communication. However, not all of the nodes in the system may communicate with each other, so there may be unused optical links. Alternatively, in a second use case, the system can be multi-programmed by partitioning it into multiple virtual machines (VMs). Because the communication between the VMs may be minimal or non-existent, there may be idle inter—VM optical links. In both of these cases, optical bandwidth and power are wasted because the underlying network topology is ill-suited to the target application and system configuration.

Hence, what is needed is a network that does not suffer from the above-described problems.

SUMMARY

One embodiment of the present disclosure provides a network node for use in a network initially having a point-to-point (P2P) network topology. This network node includes a configurable electrical circuit switch. It also include optical-to-electrical converters that convert input optical signals received via input optical links into input electrical signals and then provided to the configurable electrical circuit switch, where the input electrical signals include input packets (such as data packets and/or command packets). Moreover, the network node includes electrical-to-optical converters that convert output electrical signals received from the configurable electrical circuit switch into output optical signals provided to output optical links, where the output electrical signals include output packets (such as data packets and/or command packets). Furthermore, the network node includes a router coupled to the configurable electrical circuit switch, and terminals, which can include sources or data and/or sinks of data, coupled to the router. Additionally, control logic reconfigures the configurable electrical circuit switch to implement a predefined network topology other than the P2P network topology based on information in the input packets and/or the output packets, where the predefined network topology has a node-to-node bandwidth exceeding that of the node-to-node bandwidth of the P2P network topology.

Note that the control logic may set the configurable electrical circuit switch based on a traffic pattern associated with the input packets and/or the output packets. This traffic pattern may be associated with an application. For example, the control logic may reconfigure the configurable electrical circuit switch at the start of the application.

In some embodiments, the configurable electrical circuit switch includes a crossbar.

Moreover, the predefined network topology may include: an input primary path that routes the input packets from a first of the input optical links to a first of the terminals, an output primary path that routes the output packets from a second of the terminals to a first of the output optical links, and/or a forwarding path that routes the input packets from a second of the input optical links to a second of the output optical links. For example, the predefined network topology may include settings of switch elements in the configurable electrical circuit switch to define one of: the input primary path, the output primary path and/or the forwarding path.

Furthermore, the terminals may include: a core, a cache, a network interface and/or a memory interface.

Additionally, the predefined network topology may convert the network from a P2P network to an arbitrary network configuration (such as a torus network).

In some embodiments, the predefined network topology leverages unused input optical links and unused output optical links in the P2P network to increase a communication bandwidth between a source and a destination in the network.

Another embodiment provides a system that includes a network of network nodes (such as one or more instances of the network node) coupled by optical links initially having the P2P network topology. For example, the system may include a multi-chip module (MCM).

Another embodiment provides a method for configuring the network initially having the P2P network topology. During the method, packets are received on the input optical links. Then, a traffic pattern associated with the packets is determined. Moreover, a predefined network topology other than the P2P network topology is selected using control logic based on the determined traffic pattern, where the predefined network topology has a node-to-node bandwidth exceeding that of the node-to-node bandwidth of the P2P network topology. Next, a configurable circuit switch is reconfigured based on the predefined network topology. Furthermore, the packets are provided to a terminal in the network using the configurable circuit switch and a router.

Figure 1:
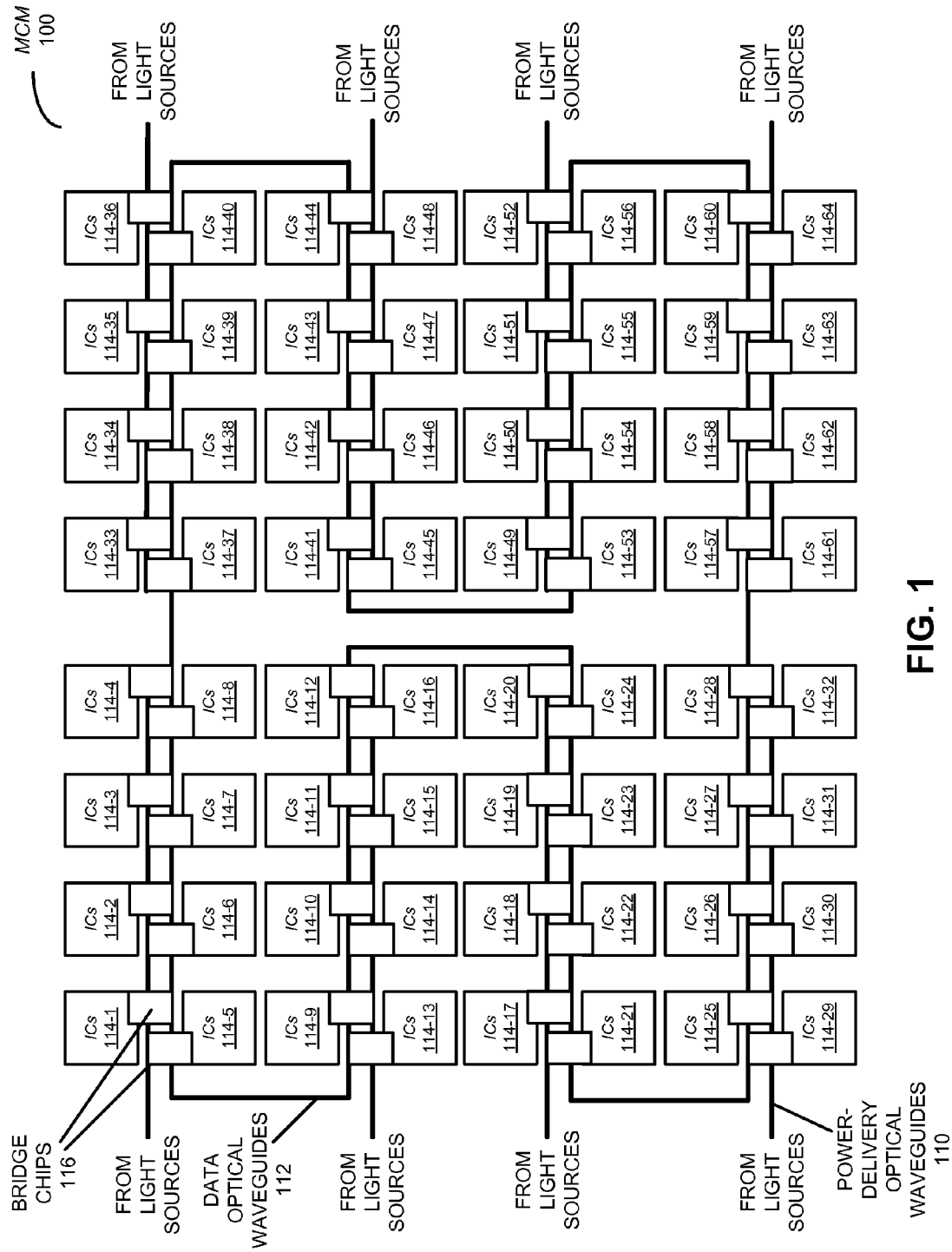
FIG. 1 is a block diagram illustrating a multi-chip module (MCM) in accordance with an embodiment of the present disclosure.

Table 1 provides maximum bandwidth gains for different MCM sizes in accordance with an embodiment of the present disclosure.

Table 2 provides the efficiency of a heuristic technique in finding contention-free secondary optical links in accordance with an embodiment of the present disclosure.

Table 3 provides maximum bandwidth gains for different MCM sizes and virtual machine (VM) cluster configurations in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a network, a multi-chip module (MCM) that includes the network, a system that includes the network, and a method for configuring a network are described. In this network, a base optical point-to-point (P2P) can be reconfigured to a target network topology. This reconfigurable architecture customizes the network topology for different classes of applications to maximize throughput. In particular, the network can function efficiently at high-radix and low-radix traffic patterns. This capability is obtained using configurable electrical circuit switches at each node in the network. These configurable electrical circuit switches can be configured so that incoming packets are directly routed to a specified output (either a local destination or an outgoing optical link) without: delay, contention, or buffers. In this way, predefined network topologies can be configured with improved node-to-node bandwidths when compared to the original P2P network by leveraging unused optical links. Furthermore, because the electrical circuit switches can be reconfigured, the network topology can be dynamically reconfigured to suit applications or application phases.

We now describe embodiments of the network. In this discussion, the network is illustrated using the MCM, and the nodes in the network (which are sometimes referred to as 'network nodes') are sites in the MCM. However, a wide variety of architectures may be used to implement the network. FIG. 1 presents a block diagram illustrating an MCM 100 (which is sometimes referred to as a 'macrochip'). In this MCM, integrated circuits (ICs) 114 or sites (such as processors and/or memory chips) may be arranged in an array, such as an 8×8 planar P2P optical network. This MCM includes power-delivery optical waveguides 110 and data optical waveguides 112 (which are sometimes referred to as 'optical links'). In particular, power-delivery optical waveguides 110 can be used to deliver optical power (or optical signals) from the optical fibers attached to the periphery of MCM 100 to the individual sites, and data optical waveguides 112 can be used to convey data (e.g., by using wavelength-division multiplexing). In FIG. 1, MCM 100 may include: 63 optical waveguides that optically couple I.C. 114-1 to the other 63 sites, 63 optical waveguides that optically couple I.C. 114-2 to the other 63 sites, etc. (However, in other embodiments there may be multiple optical waveguides per site-to-site optical link.) Therefore, note that each of the lines used to illustrate power-delivery optical waveguides 110 and/or data optical waveguides 112 in FIG. 1 may represent multiple optical waveguides.

Moreover, integrated circuits 114 may receive the optical signals, and may transmit and receive modulated optical signals when communicating information among integrated circuits 114. For example, a transmitter in a given integrated circuit may modulate a carrier wavelength in the optical signals using a ring-resonator modulator, an electro-optical modulator or a Mach-Zehnder interferometer optical modulator, and a wavelength-selective drop filter in a receiver in the given integrated circuit may receive a modulated optical signal from another integrated circuit.

Additionally, bridge chips 116, which may be in a different plane than power-delivery optical waveguides 110 and data optical waveguides 112, may be optically coupled to power-delivery optical waveguides 110, data optical waveguides 112 and integrated circuits 114 (e.g., by inter-layer optical couplers, such as: a mirror, a diffraction grating and/or an optical proximity connector). These bridge chips may convey the optical signals from power-delivery optical waveguides 110 to integrated circuits 114, and may convey the modulated optical signals to and from data optical waveguides 112 and integrated circuits 114. For example, bridge chips 116 may traverse all of co-planar power-delivery optical waveguides 110 and data optical waveguides 112. By using a single layer for optical routing, MCM 100 may provide a P2P network among integrated circuits 114 without optical-waveguide crossing that can cause power loss and cross-talk problems.

In some embodiments, power-delivery optical waveguides 110 and optical waveguides data optical waveguides 112 are implemented in a semiconductor layer on the substrate, and the optical signals or light in these optical waveguides may be highly confined because of the big difference between the index of refraction of the semiconductor layer and the surrounding material. While a wide variety of materials can be used in the semiconductor layer, in an exemplary embodiment silicon is used. Furthermore, this silicon semiconductor layer may be disposed on a buried-oxide layer which, in turn, is disposed on the substrate. Once again, a wide variety of materials may be used in the substrate, such as a semiconductor, glass or plastic. In an exemplary embodiment, silicon is used in the substrate, along with silicon dioxide in the buried-oxide layer. Consequently, in some embodiments, the substrate, the buried-oxide layer and the semiconductor layer may comprise a silicon-on-insulator (SOI) technology.

In an exemplary embodiment, power-delivery optical waveguides 110 and data optical waveguides 112 convey optical signals (i.e., light) having carrier wavelengths between 1.1-1.7 µm, such as an optical signal having a fundamental carrier wavelength of 1.3 or 1.55 µm. These optical waveguides may have thicknesses between 0.25 and 3 µm, and widths between 0.5 and 3 µm. Note that because power-delivery optical waveguides 110 and data optical waveguides 112 may have quasi-rectangular cross-sections, they may be quasi-single mode components. Moreover, the buried-oxide layer may have a thickness between 0.3 and 3 µm.

MCM 100 can be used in a number of different ways. In one mode, it can be used to run a single, large, parallel application. In this case, the traffic pattern in the network depends on the communication characteristics of the application. Some applications produce high-radix (all-to-all) traffic, which, in general, prefers a P2P network. Other applications, such as heat-flow simulation problems, use nearest-neighbor communication, which usual favors a mesh or a torus network. In another mode, MCM 100 can be used as a partitioned cluster with multiple virtual machines (VMs), causing most of the communication to be confined to each VM. Note that any of these cases may result in unused optical links in the network.

Figure 2:
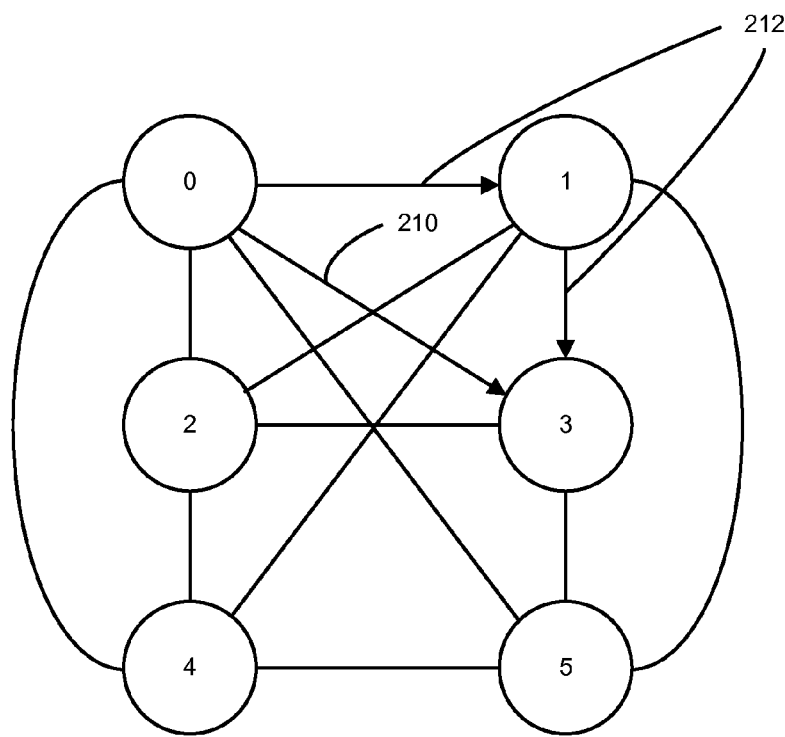
FIG. 2 is a block diagram illustrating a point-to-point (P2P) network in accordance with an embodiment of the present disclosure.

However, when the traffic pattern of the application or the system configuration is known (which is usually true for many use cases), the P2P network in the proposed network can be dynamically reconfigured to a target network topology that may be better used by the application. The process of reconfiguration involves using the unused optical links of the P2P network to forward traffic to the destination. For example, consider the 6-node P2P network shown in FIG. 2. Assume that the application thread running on node 0 communicates only with node 3. In a typical P2P network, node 0 can only use its direct optical link to node 3 for communication. However, if the optical links between the pairs node 0, node 1 and node 1, node 3 are unused, then with reconfiguration, node 0 can use its unused optical link to node 1 to forward data to node 3. Note that optical link 210 in FIG. 2 is a primary optical link from node 0 to node 3 that already exists in the P2P network, and optical link 212 is a forwarded optical link or a secondary optical link from node 0 to node 3 via node 1.

To implement this reconfiguration, the forwarding node (node 1 in this example) has a provision for hardware switching. Moreover, there is a technique for determining the forwarding nodes and the optical links with no contention at the forwarding nodes. In addition, there is a mechanism to propagate the forwarding information to all the sites/nodes on MCM 100 (FIG. 1).

Figure 3:
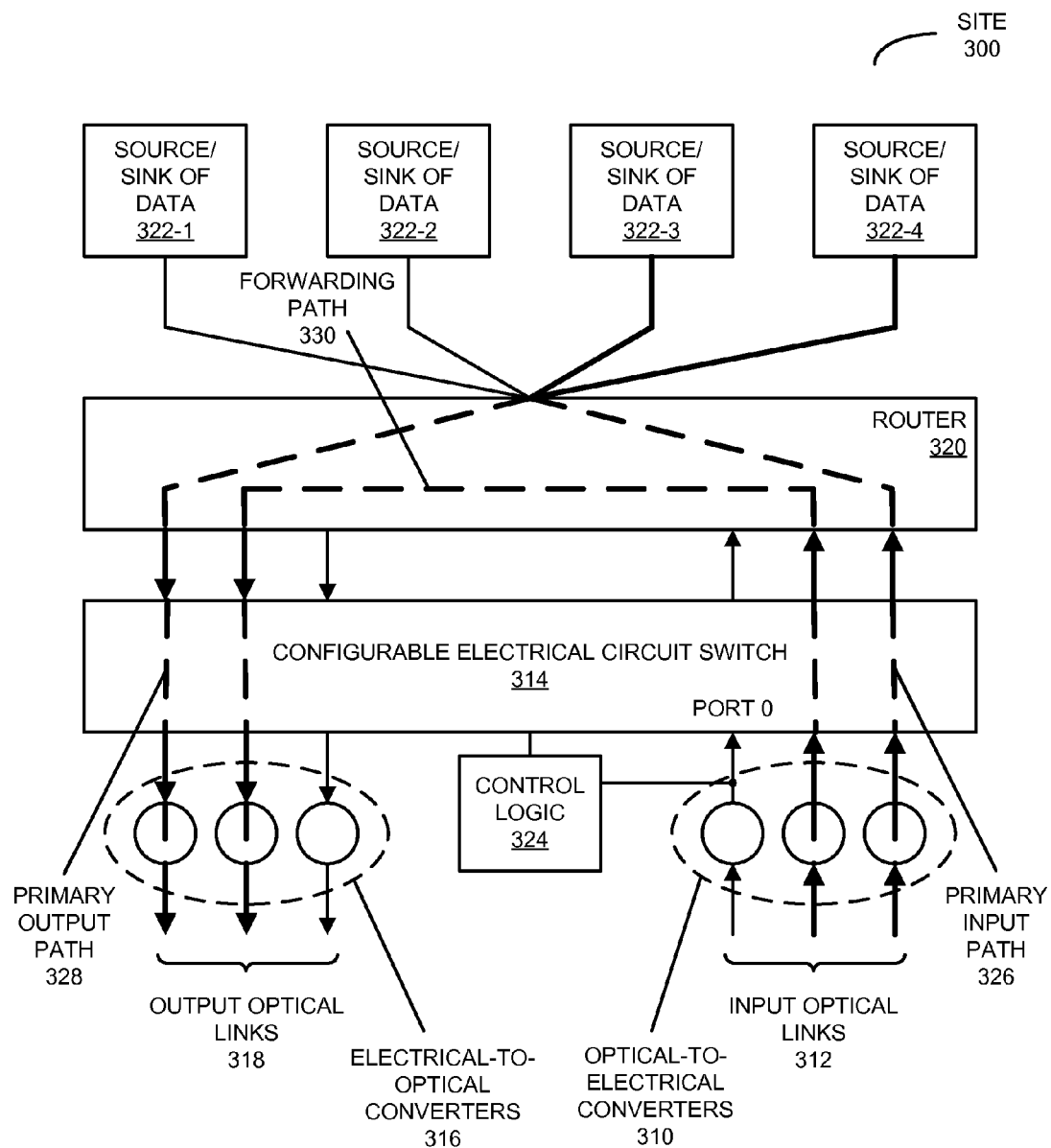
FIG. 3 is a block diagram illustrating a site in the MCM of FIG. 1 in accordance with an embodiment of the present disclosure.

FIG. 3 presents a block diagram illustrating a site 300 (or a network node) in MCM 100 (FIG. 1) and, more generally, a network node in the network. This site includes optical-to-electrical converters 310 that convert input optical signals received via input optical links 312 into input electrical signals and then provided to a configurable electrical circuit switch 314, where the input electrical signals include input packets (such as data packets and/or command packets). Moreover, site 300 includes electrical-to-optical converters 316 that convert output electrical signals received from configurable electrical circuit switch 314 into output optical signals provided to output optical links 318, where the output electrical signals include output packets (such as data packets and/or command packets).

Furthermore, site 300 includes a router 320 coupled to configurable electrical circuit switch 314, and sources/sinks of data 322 (such as: a core, a cache, a network interface and/or a memory interface; these are also referred to as "terminals") coupled to router 320. Note that sources/sinks of data 322 originate and consume data on the network. These sources/sinks of data share the input and output optical ports through router 320. In some embodiments, configurable electrical circuit switch 314 includes a crossbar. Note that the circuit-switched capability of configurable electrical circuit switch 314 may eliminate contention and energy overheads, but may require that the target network topology be predetermined. (However, in other embodiments the target network topology may be determined dynamically or in real time.)

Additionally, control logic 324 reconfigures configurable electrical circuit switch 314 to implement a predefined (target) network topology based on information in the input packets and/or the output packets. Note that control logic 324 may reconfigure configurable electrical circuit switch 314 based on a traffic pattern associated with the input packets and/or the output packets. (Thus, configurable electrical circuit switch 314 may switch data from input ports to router 320 and/or to output ports.) This traffic pattern may be associated with an application. For example, control logic 324 may reconfigure configurable electrical circuit switch 314 at the start of the application (i.e., when the application is executed) and/or when MCM 100 (FIG. 1) is booted. Consequently, control logic 324 may not examine all of the input packets and/or all of the output packets.

Moreover, as shown in FIG. 3, within site 300 (i.e., within a network node) the predefined network topology may include: a input primary path 326 that routes the input packets from a first of input optical links 312 to a first of sources/sinks of data 322, a output primary path 328 that routes the output packets from a second of sources/sinks of data 322 (which may be the same or different than the first of sources/sinks of data 322) to a first of output optical links 318, and/or a forwarding path 330 that routes the input packets from a second of input optical links 312 (which may be the same or different than the first of input optical links 312) to a second of output optical links 318 (which may be the same or different than the first of output optical links 318). For example, the predefined network topology may include settings of switch elements in configurable electrical circuit switch 314 to define one of: input primary path 326, output primary path 328 and/or forwarding path 330.

Additionally, the predefined network topology may configure the network from a P2P network to an arbitrary network configuration (such as a torus network). In some embodiments, the predefined network topology leverages unused input optical links and unused output optical links in the P2P network to increase a communication bandwidth between a source and a destination in the network relative to that of a P2P network. For example, in a 4×4 arrangement of network nodes in a P2P network topology (or a mesh) there are 16 possible destinations. By identifying intermediate network nodes that have unused bandwidth during communication between a first network node and a second network node, and that the first network node is directly coupled to, the communication bandwidth can be increased by using the intermediate network node to forward packets to the second network node. While this dynamic reconfiguration may have a communication bandwidth that is less than a static implementation of the predefined network topology, such as static implementation is typically suitable for only one class of applications and could not be adapted to other applications.

Note that the proposed network architecture does not need any additional optical components. It may retain the optical P2P network unchanged. The issue of setup time can be addressed by reconfiguring the underlying P2P network through the use of configurable electrical circuit switches (such as configurable electrical circuit switch 314) on each network node to match the traffic pattern demanded by each application. This reconfiguration may be performed at a larger granularity, such as the beginning of the execution of an application. If an application passes through distinct (and long-running) phases with different traffic patterns, it is possible that the network could be reconfigured at the beginning of each phase.

By setting the appropriate circuit switches in each site to route the traffic on an input port to a specific output port, we can reconfigure the P2P network into any target network topology. For example, in FIG. 2, the switch in node 1 may set up a circuit from input port $_0$ (input from node 0) to output port 3 (output to node 3). Thus, conversion of a P2P network to a target network topology may involve a switch-state-map (SSM) for every node on the MCM (or, more generally, in the network). The SSM may specify the state for every switching element in the circuit-switched crossbar. In this architecture, node 0 on the MCM is designated as the master node that initiates and controls all the interconnect reconfigurations.

As shown in FIG. 3, the incoming traffic on port 0 (coming from node 0) on every node is monitored by control logic 324. On a command from the user or the application, the master node may send reconfiguration-command packets to all the nodes, which are received on the nodes on port 0. Because control logic 324 is placed before the circuit-switched crossbar, it may monitor the traffic even if the circuit is set up to forward the traffic to another destination. Note that the SSM can be pre-computed for a set of target network topologies. In this case, the master node may send pointers to the SSM in the command packets. As an alternative technique, the master node can also send the SSM as part of the command packet for each node. This mechanism can be used to reconfigure the network from a P2P network to a target network topology or vice versa.

In an exemplary embodiment of a use case, the MCM is used as a single cluster. For a specific target network topology, each node/site may have a certain number of outgoing and incoming optical links in a connection pattern as specified by the target network topology. These are referred to as the primary optical links. Because the base network topology is a P2P network, these primary optical links already exist. The reconfiguration process then finds as many forwarding nodes (secondary optical links) as possible for each primary optical link in the system. The following section quantifies the maximum bandwidth gain by specifying the number of secondary optical links that exist for each primary optical link.

Assume 'n' sites on an MCM. Consequently, the total number of optical links is $n \cdot (n-1)$. Let be the number of primary optical links per site in the target network topology. Then, the total number of primary optical links in the MCM is '$n \cdot m$.' Each secondary (forwarding) optical link for a corresponding primary optical link may use two P2P optical links Therefore, the number of optical links in a set of secondary optical links on the MCM is $2 \cdot n \cdot m$. Assume that 'k' sets of secondary optical links can be found, where $$n \cdot m + 2 \cdot k \cdot n \cdot m \leq n \cdot (n-1).$$

It follows that $$k = \mathrm{floor}\left(\frac{n-2-1}{2m}\right).$$

Thus, the achieved usable peak bandwidth gain compared to the target network topology implemented in the P2P network is k+1.

As an example, assume that n is 16 (a 4×4 MCM) and the target network topology is a 2-dimensional (2D) torus, which has m equal to four optical links per node. Then $$k = \mathrm{floor}\left(\frac{16-4-1}{2 \cdot 4}\right) = 1$$

and the bandwidth gain is 2.

We now describe a heuristic for finding the secondary optical links. In order to achieve a contention-free and balanced reconfiguration, the following conditions must be satisfied: a primary optical link cannot be used as a part of a secondary optical link; an optical link can be part of one and only one secondary optical link; and the number of secondary optical links per primary optical link should be maximized (to achieve the best bandwidth gain).

There are two techniques for finding the secondary optical links. One is a heuristic-based generic technique that can be applied to any target network topology. The other technique is a deterministic technique that exploits the knowledge of the target network topology. The heuristic-based technique is described below. This heuristic-based technique does not guarantee 100% success, but it does find most of the secondary optical links satisfying the preceding conditions. The heuristic-based technique takes as input all the primary optical links for each site in the target network topology and deterministically searches for the secondary optical links for each primary optical link.

In the following discussion, x, y and z denote nodes in the network, and [x-z] denotes a unidirectional optical link from node x to node z. A secondary optical link from x to z forwarded through node y is denoted [x-y-z].

The operations to reconfigure a P2P network to a target network topology include a phase 1 in which all of the primary optical links for all of the nodes are assigned. Then, in phase 2, for a node src, secondary routes (if possible) are identified, in turn, to each of its m neighbors (where each neighbor is called dst). For every node lnk, but not including node src and node dst, whether optical links [src-lnk] and [lnk-dst] are both free is tested. If yes, the secondary optical link [src-lnk-dst] is selected.

However, if there is no node lnk, so that [src-lnk] and [lnk-dst] are both free, then a previously assigned secondary optical link [a-x-b] is looked for so that [src-x] and [x-dst] are both free, and to see if there is another node y so that [a y] and [y-b] are both free. If such a node y is found, the secondary optical link [src-x-dst] is set and the [a-x-b] secondary optical link is modified to be [a-y-b].

If no such node x can be found, then all of the previously assigned secondary optical links (paths) for which one part of the path [src-x-dst] (either [src-x] or [x-dst]) is free are stored (or remembered).

The operations in phase 2 are applied to all of the nodes in succession, so that phase 2 is repeated VC times, where VC is the maximum number of secondary optical links for every primary optical link.

Next, in phase 3, if there are still node pairs for which secondary optical links have not been found, for each failed node pair the first remembered path for this pair from phase 2 is considered. The remembered path is deleted and one of the optical links is used to fix the original node pair that had not been fixed earlier. Moreover, the operations in phase 2 are applied to try to resolve the deleted (now failed) path. If this succeeds, everything is now okay for both the original node pair and the pair for the deleted path. Otherwise, the deleted path is restored, and the next remembered path for the original failed node is considered. If none of the remembered paths works, then the heuristic technique cannot find all of the secondary optical links that were requested.

In an exemplary embodiment of another use case, the MCM is configured as a cluster of VMs. When an MCM is configured as a cluster of VMs, the inter-VM optical links may be unused, leading to wasted bandwidth and energy. Consequently, the inter-VM optical links can be used to create secondary optical links for the optical link in the P2P network that already exists between the nodes in a VM.

The maximum bandwidth gain can be calculated by assuming 'n' sites on an MCM. The total number of optical links is $n \cdot (n-1)$, and the MCM is partitioned into 'v' clusters of size 'm' sites using VMs. Therefore, v=n/m. The number of primary optical links on the partitioned MCM is $v \cdot m \cdot (m-1)$. Each secondary (forwarded) optical link for a corresponding primary optical link uses two P2P optical links. Moreover, the number of optical links in a set of secondary optical links on the MCM is $2 \cdot v \cdot m \cdot (m-1)$. Assume that 'k' sets of secondary optical links can be found, where $$m \cdot (m-1) + 2 \cdot k \cdot v \cdot m \cdot (m-1) \leq n \cdot (n-1)$$

and $$k = \text{floor}\left(\frac{n-m}{2 \cdot m \cdot (m-1)}\right)$$

Based on this analysis, the achieved usable peak bandwidth gain compared to the VM cluster implemented in the P2P network is k+1.

Figure 4:
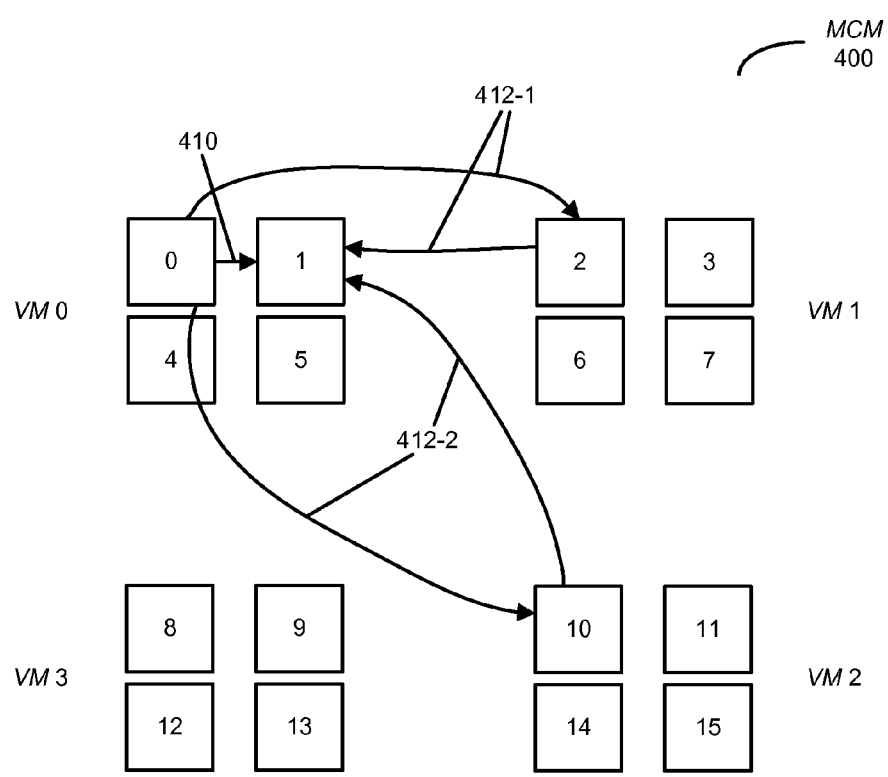
FIG. 4 is a block diagram illustrating an MCM in accordance with an embodiment of the present disclosure.

We now describe a technique to determine the secondary set of optical links for a cluster of VMs using FIG. 4, which presents a block diagram illustrating a 4×4 MCM 400 configured as four 2×2 VMs, as an example. This technique deterministically assigns all of the secondary optical links for the VM configuration with four 4×4 VMs. During phase 1 of this technique, all of the primary optical links within each VM (VM0, VM1, VM2 and VM3) in FIG. 4 are assigned. This operation assigns twelve optical links per VM, for a total of 48 optical links. Note that there are 240 optical links in MCM 400.

Then, in phase 2, secondary optical links for VM0 are assigned using nodes in VM1, secondary optical links for VM1 are assigned using nodes in VM3, secondary optical links for VM3 are assigned using nodes in VM2, and secondary optical links for VM2 are assigned using nodes in VM0. In each case, the src nodes in a VM are processed in a clockwise order and the dst nodes are also visited in clockwise order. This operation assigns 24 optical links per VM or 96 optical links in total. Note that there are 32×4 or 128 optical links connecting the nodes in each pair of VMs. Moreover, there are 128×96 or 32 optical links omitted in this assignment.

Next, in phase 3, all of the omitted optical links not used in phase 2 are identified and assigned. There are now 48+128 or 176 optical links assigned. The remaining 64 optical links connect nodes in VMs that are diagonally opposite (VM0-VM3 and VM1-VM2).

Furthermore, in phase 4, the remaining node pairs are connected using the optical links from the diagonal pairs. This operation uses 64 optical links. At this point, every node has two secondary optical-link connections to every node in its VM and all of the optical links are allocated.

Note that the preceding technique can be extended to other MCM VM sizes. Moreover, this technique can be recursively applied to each VM to reconfigure the network topology inside a VM from a P2P network to any other target network topology.

In an exemplary embodiment, the P2P network is reconfigured for additional bandwidth on a 2D torus interconnect. In a 2D torus network, each node has four incoming and outgoing optical links (i.e., m equals four). In an 8×8 MCM, k equals 7 for a maximum of an 8× gain in per optical-link bandwidth compared the P2P network. Table 1 shows the computed maximum achievable bandwidth gains for different MCM sizes. Note that n equals $N^2$, and the bandwidth gain is relative to the P2P network. Furthermore, Table 2 shows the efficiency of the heuristic in identifying the contention-free secondary optical links. Note that the neighborhood pairs are the number of primary optical links in the system, and the pairs with k optical links are the number of primary optical links for which the heuristic technique identifies k secondary optical links. Moreover, note that the heuristic technique identifies at least 91.4% of the secondary optical links

TABLE 1

| N | Total Links $n \cdot (n-1)$ | Number of Primary Optical Links $n \cdot m$ | Number of Secondary Optical Links $2 \cdot n \cdot m$ | Sets of Secondary Optical Links k | Optical Links Used $n \cdot m + 2 \cdot k \cdot n \cdot m$ | Bandwidth Gain $k+1$ |
|---|---|---|---|---|---|---|
| 4 | 240 | 64 | 128 | 1 | 192 | 2 |
| 5 | 600 | 100 | 200 | 2 | 500 | 3 |
| 6 | 1260 | 144 | 288 | 3 | 1008 | 4 |
| 7 | 2352 | 196 | 392 | 5 | 2156 | 6 |
| 8 | 4032 | 256 | 512 | 7 | 3840 | 8 |

Figure 5:
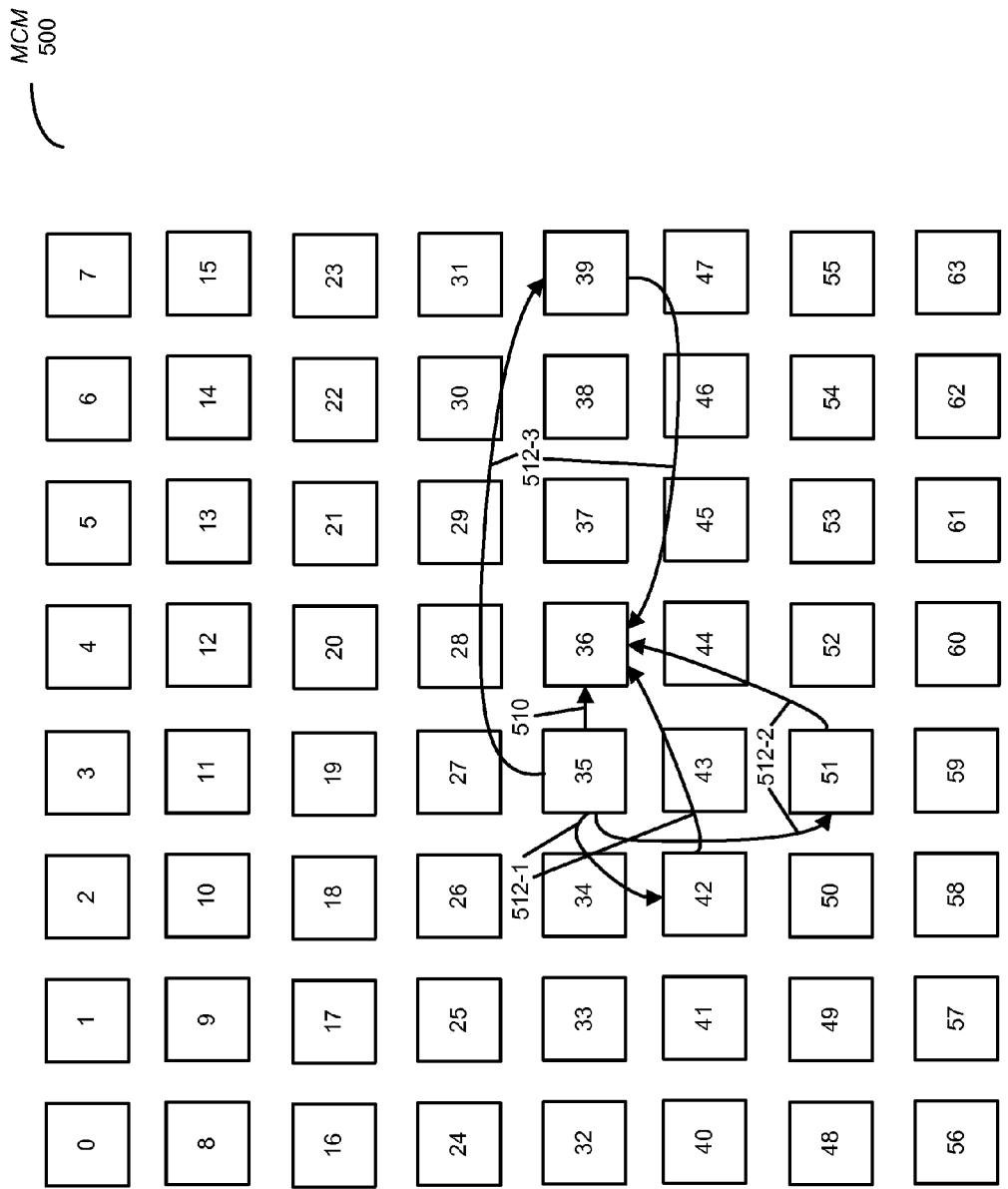
FIG. 5 is a block diagram illustrating an MCM in accordance with an embodiment of the present disclosure.

FIG. 5, which presents a block diagram illustrating an MCM 500, shows primary optical link 510 connecting node 35 to node 36 and three secondary optical links 512 connecting node 35 to node 36. In FIG. 5, the three secondary optical links 512 connecting node 35 to node 36 are [35-42-36], [35-51-36] and [35-39-36] respectively, giving a bandwidth gain of four for the node 35-to-node 36 connection. The single optical links in the secondary optical links are not added to the network, as they are already there in the underlying P2P network. Also in FIG. 5, note that the secondary optical link [35-37-36] may not be used because the primary optical link [37-36] is already assigned as the primary optical link connecting node 37 to node 36.

TABLE 2

| N | Sets of Secondary Optical Links k | Neighborhood Pairs | Pairs With k Links | Percentage (%) | Pairs With k − 1 Links |
|---|---|---|---|---|---|
| 4 | 1 | 64 | 63 | 98.4 | 1 |
| 5 | 2 | 100 | 100 | 100.0 | 0 |
| 6 | 3 | 144 | 144 | 100.0 | 0 |
| 7 | 5 | 196 | 195 | 99.4 | 1 |
| 8 | 7 | 256 | 234 | 91.4 | 22 |

In another exemplary embodiment, the P2P network is reconfigured for additional bandwidth on a partitioned MCM with multiple VMs. In particular, as shown in FIG. 4, a 4×4 (16-site) MCM may be partitioned into four VMs, each with four sites. In this case, there are a maximum of two secondary sets of optical links, giving a 3× peak bandwidth gain over the cluster interconnect implemented on the P2P network. Moreover, in FIG. 4, node 0 is connected to node 1 using the primary optical link [0-1] 410 and two secondary optical links 412, [0-2-1] and [0-10-1]. Once again, these secondary optical links may not be added to the network as they are already present in the underlying P2P network. Table 3 lists the computed maximum achievable bandwidth gains for different MCM sizes and VM configurations. Note that n, which equals $N^2$ or $v \cdot m$, is the number of nodes, the number of sets k is the maximum achievable secondary optical links for each primary optical link, and the bandwidth gain is the peak bandwidth increase per primary optical link compared to the P2P network.

TABLE 3

| N | VM/System v | Nodes/VM m | Number of Primary Optical Links v·m·(m − 1) | Sets of Secondary Optical Links k | Number of Secondary Optical Links/Set 2·v·m·(m − 1) | Bandwidth Gain k + 1 |
|---|---|---|---|---|---|---|
| 4 | 2 | 8 | 112 | 0 | 244 | 1 |
| 5 | 4 | 4 | 48 | 2 | 96 | 3 |
| 6 | 4 | 9 | 288 | 1 | 576 | 2 |
| 8 | 4 | 16 | 960 | 1 | 1920 | 2 |
| 8 | 16 | 4 | 192 | 10 | 384 | 11 |

Figure 6:
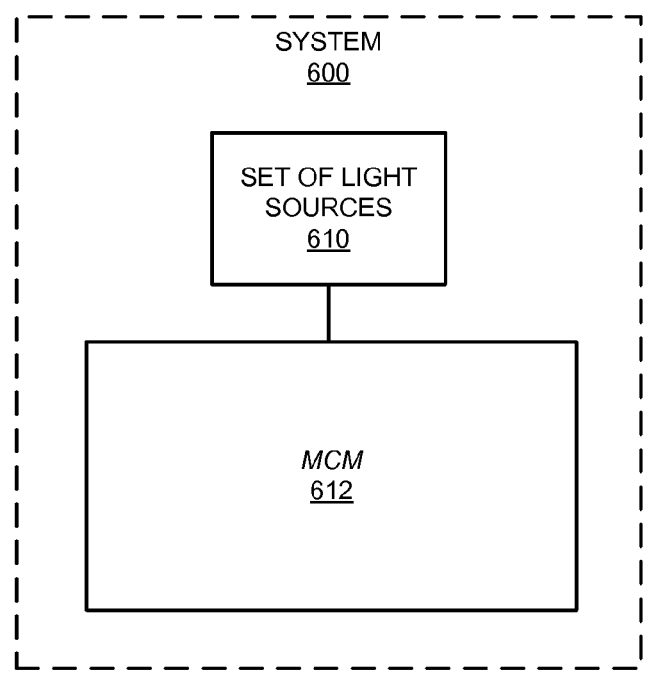
FIG. 6 is a block diagram illustrating a system in accordance with an embodiment of the present disclosure.

The preceding embodiments of the MCM (and the network) may be used in a variety of applications. This is shown in FIG. 6, which presents a block diagram illustrating a system 600. System 600 includes: set of light sources 610 that output optical signals having carrier wavelengths; and MCM 612. For example, set of light sources 610 may include tunable-carrier wavelength lasers that can be tuned to any carrier wavelength in the usable spectrum or non-tunable lasers having fixed carrier wavelengths. This set of light sources may be optically coupled to MCM 612 by optical fiber(s).

System 600 may include: a VLSI circuit, a switch, a hub, a bridge, a router, a communication system, a storage area optical network, a data center, an optical network (such as a local area optical network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device (such as a tablet computer), a supercomputer, an optical network-attached-storage (NAS) system, a storage-area-network (SAN) system, and/or another electronic computing device. Note that a given computer system may be at one location or may be distributed over multiple, geographically dispersed locations.

The preceding embodiments of the MCM (and the network), as well as system 600, may include fewer components or additional components. Although these embodiments are illustrated as having a number of discrete items, the MCM and the system are intended to be functional descriptions of the various features that may be present rather than structural schematics of the embodiments described herein. Consequently, in these embodiments two or more components may be combined into a single component, and/or a position of one or more components may be changed. For example, set of light sources 610 may be included on MCM 612. In addition, functionality in the preceding embodiments of the MCM and the system may be implemented more in hardware and less in software, or less in hardware and more in software, as is known in the art. For example, functionality may be implemented in one or more application-specific integrated circuits (ASICs) and/or one or more digital signal processors (DSPs).

While the preceding embodiments have been illustrated with particular components, configurations and optical network architectures, a wide variety of additional variations to the network in the embodiments of the MCM may be used, as is known to one of skill in the art, including: the use of additional or fewer components, arbitration techniques (as needed), etc.

Figure 7:
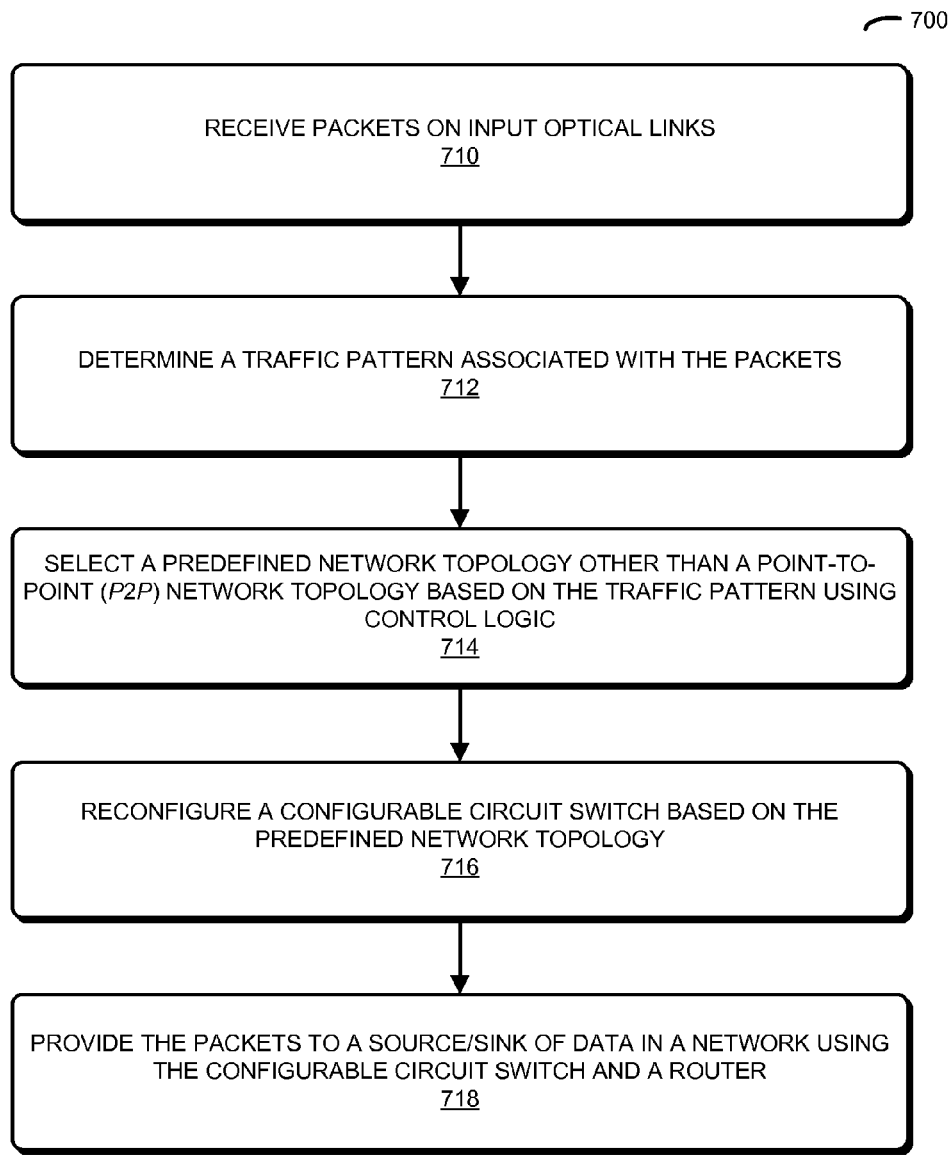
FIG. 7 is a flow diagram of a method for configuring a network in accordance with an embodiment of the present disclosure.

We now describe embodiments of the method. FIG. 7 presents a flow chart illustrating a method 700 for configuring a network initially having a P2P network topology, such as the network in one of the previous embodiments of the MCM. During the method, packets are received on input optical links (operation 710). Then, a traffic pattern associated with the packets is determined (operation 712). Moreover, a predefined network topology other than the P2P network topology is selected using control logic based on the determined traffic pattern (operation 714), where the predefined network topology has node-to-node bandwidth exceeding that of the node-to-node bandwidth of the P2P network topology. Next, a configurable circuit switch is reconfigured based on the predefined network topology (operation 716). Furthermore, the packets are provided to a data source/sink in the network using a configurable circuit switch and a router (operation 718).

For example, a control or command packet may be received in the input optical links. The predefined network topology may be specified by values in the control packet, and this predefined network topology may then be implemented at one or more of the network nodes by setting the switched routes in each configurable circuit switch on the one or more network nodes. Therefore, if the traffic pattern associated with an application is known in advance, a control packet can be sent to each network node specifying the predefined network topology and, thus, how to configure the configurable circuit switch on each network node. Then, during operation, when packets are received at each network node, the may be routed according to the settings of the configurable circuit switches. Moreover, if another control packet is received, the configurable circuit switches may be reconfigured.

In some embodiments of method 700, there are additional or fewer operations. Moreover, the order of the operations may be changed, and/or two or more operations may be combined into a single operation.

While the target network topology in the preceding discussion was predefined, in other embodiments the target network topology may not be predefined. In addition, while the network was illustrated with configurable electrical circuit switches (such as configurable electrical circuit switch 314 in FIG. 3), in other embodiments optical switches are used. Furthermore, the configuration technique may be used with a wide variety of networks, including those with electrical interconnects (that convey electrical signals) and/or optical interconnects (that convey optical signals).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A network node for use in a network initially having a point-to-point (P2P) network topology, comprising:
    a configurable electrical circuit switch;
    optical-to-electrical converters, coupled to the configurable electrical circuit switch, configured to convert input optical signals received via input optical links into input electrical signals provided to the configurable electrical circuit switch, wherein the input electrical signals include input packets;

electrical-to-optical converters, coupled to the configurable electrical circuit switch, configured to convert output electrical signals received from the configurable electrical circuit switch into output optical signals provided to output optical links, wherein the output electrical signals include output packets;

a router coupled to the configurable electrical circuit switch;

terminals, which can include sources of data and/or sinks of data, coupled to the router; and control logic, coupled to the configurable electrical circuit switch, configured to reconfigure the configurable electrical circuit switch to implement a predefined network topology other than the P2P network topology based on information in one of the input packets and the output packets, wherein the predefined network topology has a node-to-node bandwidth exceeding that of a node-to-node bandwidth of the P2P network topology.

2. The network node of claim 1, wherein the control logic is configured to set the configurable electrical circuit switch based on a traffic pattern associated with one of the input packets and the output packets.

3. The network node of claim 2, wherein the traffic pattern is associated with an application.

4. The network node of claim 3, wherein the control logic reconfigures the configurable electrical circuit switch at the start of the application.

5. The network node of claim 1, wherein the configurable electrical circuit switch includes a crossbar.

6. The network node of claim 1, wherein the predefined network topology includes one of: an input primary path that routes the input packets from a first of the input optical links to a first of the terminals, an output primary path that routes the output packets from a second of the terminals to a first of the output optical links, and a forwarding path that routes the input packets from a second of the input optical links to a second of the output optical links.

7. The network node of claim 6, wherein the predefined network topology includes settings of switch elements in the configurable electrical circuit switch to define one of the input primary path, the output primary path and the forwarding path.

8. The network node of claim 1, wherein the terminals include one of: a core, a cache, a network interface and a memory interface.

9. The network node of claim 1, wherein the predefined network topology converts the network from a P2P network to an arbitrary network configuration.

10. The network node of claim 1, wherein the predefined network topology leverages unused input optical links and unused output optical links in a P2P network to increase a communication bandwidth between a source and a destination in the network.

11. A system, comprising a network with network nodes coupled by optical links initially having a point-to-point (P2P) network topology, wherein a given network node includes:

a configurable electrical circuit switch;

optical-to-electrical converters, coupled to the configurable electrical circuit switch, configured to convert input optical signals received via input optical links into input electrical signals provided to the configurable electrical circuit switch, wherein the input electrical signals include input packets;

electrical-to-optical converters, coupled to the configurable electrical circuit switch, configured to convert output electrical signals received from the configurable electrical circuit switch into output optical signals provided to output optical links, wherein the output electrical signals include output packets;

a router coupled to the configurable electrical circuit switch;

terminals, which can include sources of data and/or sinks of data, coupled to the router; and control logic, coupled to the configurable electrical circuit switch, configured to reconfigure the configurable electrical circuit switch to implement a predefined network topology other than the P2P network topology based on information in one of the input packets and the output packets, wherein the predefined network topology has a node-to-node bandwidth exceeding that of a node-to-node bandwidth of the P2P network topology.

12. The system of claim 11, wherein the control logic is configured to set the configurable electrical circuit switch based on a traffic pattern associated with one of the input packets and the output packets.

13. The system of claim 12, wherein the traffic pattern is associated with an application.

14. The system of claim 13, wherein the control logic reconfigures the configurable electrical circuit switch at the start of the application.

15. The system of claim 11, wherein the configurable electrical circuit switch includes a crossbar.

16. The system of claim 11, wherein the predefined network topology includes one of: an input primary path that routes the input packets from a first of the input optical links to a first of the terminals, an output primary path that routes the output packets from a second of the terminals to a first of the output optical links, and a forwarding path that routes the input packets from a second of the input optical links to a second of the output optical links.

17. The system of claim 16, wherein the predefined network topology includes settings of switch elements in the configurable electrical circuit switch to define one of the input primary path, the output primary path and the forwarding path.

18. The system of claim 11, wherein the terminals include one of: a core, a cache, a network interface and a memory interface.

19. The system of claim 11, wherein the predefined network topology converts the network from a P2P network to an arbitrary network configuration.

20. A method for configuring a network initially having a point-to-point (P2P) network topology, wherein the method comprises:

receiving packets on input optical links;

determining a traffic pattern associated with the packets;

using control logic, selecting a predefined network topology other than the P2P network topology based on the determined traffic pattern, wherein the predefined network topology has a node-to-node bandwidth exceeding that of a node-to-node bandwidth of the P2P topology;

setting a configurable circuit switch based on the predefined network topology; and providing the packets to a terminal in the network using the configurable circuit switch and a router.

* * * * *

UNITED STATES PATENT AND TRADEMARK OFFICE
CERTIFICATE OF CORRECTION

| | | |
|---|---|---|
| PATENT NO. | : 9,020,347 B2 | Page 1 of 1 |
| APPLICATION NO. | : 14/021555 | |
| DATED | : April 28, 2015 | |
| INVENTOR(S) | : Koka et al. | |

It is certified that error appears in the above-identified patent and that said Letters Patent is hereby corrected as shown below:

In the specification,

In column 6, line 60, delete "port $_0$" and insert -- port 0 --, therefor.

In column 7, line 33, delete "links" and insert -- links. --, therefor.

In column 8, line 28, delete "[a y]" and insert -- [a-y] --, therefor.

In column 8, line 37, delete "VC times" and insert -- 'k times' --, therefor.

In column 8, line 37, delete "VC is" and insert -- 'k is' --, therefor.

In column 9, line 36, delete "128×96" and insert -- 128-96 --, therefor.

In column 9, line 67, delete "links" and insert -- links. --, therefor.

Signed and Sealed this
Ninth Day of February, 2016

Michelle K. Lee
*Director of the United States Patent and Trademark Office*